(12) United States Patent
Trousett et al.

(10) Patent No.: US 7,123,255 B2
(45) Date of Patent: Oct. 17, 2006

(54) METHOD AND SYSTEM FOR MEDICAL IMAGE DISPLAY OF A THREE-DIMENSIONAL REPRESENTATION

(75) Inventors: Yves Trousett, Palaiseau (FR); Laurent Launay, Saint Remy les Chevreuse (FR); Erwan Kerrien, Nancy (FR)

(73) Assignee: GE Medical Systems Global Technology Company LLC, Naukesha, NJ (US)

( * ) Notice: Subject to any disclaimer, the term of this patent is extended or adjusted under 35 U.S.C. 154(b) by 0 days.

(21) Appl. No.: 10/125,242

(22) Filed: Apr. 17, 2002

(65) Prior Publication Data
US 2003/0018250 A1 Jan. 23, 2003

(30) Foreign Application Priority Data
Apr. 26, 2001 (FR) .................................. 01 05611

(51) Int. Cl.
*G06T 15/00* (2006.01)
(52) U.S. Cl. ....................... 345/419; 345/473
(58) Field of Classification Search ............... 600/425, 600/45, 101, 109, 111, 112, 166; 378/41; 345/419, 427, 473, 474, 475, 629, 630, 633, 345/634, 660, 661, 662, 664, 665, 666; 715/719
See application file for complete search history.

(56) References Cited

U.S. PATENT DOCUMENTS

| | | | | |
|---|---|---|---|---|
| 5,252,599 A * | 10/1993 | Girard et al. | ............... | 514/456 |
| 5,687,306 A * | 11/1997 | Blank | ........................ | 345/634 |
| 5,737,506 A | 4/1998 | McKenna et al. | .......... | 395/125 |
| 5,787,886 A * | 8/1998 | Kelly et al. | .................. | 600/407 |
| 5,900,878 A * | 5/1999 | Goto et al. | .................. | 345/419 |
| 6,167,292 A * | 12/2000 | Badano et al. | .............. | 600/407 |
| 6,359,959 B1 * | 3/2002 | Butler et al. | .................. | 378/20 |
| 6,411,298 B1 * | 6/2002 | Goto et al. | .................. | 345/427 |
| 6,484,048 B1 * | 11/2002 | Hoshino et al. | ............ | 600/410 |
| 6,614,453 B1 * | 9/2003 | Suri et al. | .................... | 715/764 |
| 6,674,894 B1 * | 1/2004 | Parker et al. | .................. | 382/154 |
| 6,690,371 B1 * | 2/2004 | Okerlund et al. | ........... | 345/424 |
| 6,738,091 B1 * | 5/2004 | Eouzan et al. | ......... | 348/211.14 |
| 6,775,405 B1 * | 8/2004 | Zhu | ........................... | 382/154 |
| 6,778,846 B1 * | 8/2004 | Martinez et al. | ............ | 600/407 |
| 6,844,884 B1 * | 1/2005 | Balloni et al. | .............. | 345/629 |

FOREIGN PATENT DOCUMENTS

| | | |
|---|---|---|
| EP | 629963 | 12/1994 |
| FR | 2779853 | 12/1999 |
| WO | 9520343 | 8/1995 |

OTHER PUBLICATIONS

Friets et al, "A Frameless Stereotaxic Operating Microscope for Neuro-Surgery", IEEE Trans. on Biomedical Engineering, v. 36, No. 6, Jun. 1, 1989 pp 608-617.
Kihara et al, "Markerless Registration for Image Guided Surgery", Medical Imaging Technology, v. 16,No. 3, May 1998 pp 225-235.

\* cited by examiner

*Primary Examiner*—Ulka J. Chauhan
*Assistant Examiner*—Enrique L. Santiago
(74) *Attorney, Agent, or Firm*—Cantor Colburn LLP; Jay L. Chaskin

(57) ABSTRACT

A method and system for medical image display comprising means for acquiring two-dimensional images; means for displaying images; means for managing the display of a three-dimensional representation on the means display and for automatically orienting the three-dimensional representation according to at least one operating parameter of the means for acquisition means so that the three-dimensional representation is viewed on the means for display from a viewpoint corresponding to that from which the means for image acquisition acquire or have acquired a two-dimensional image.

30 Claims, 1 Drawing Sheet

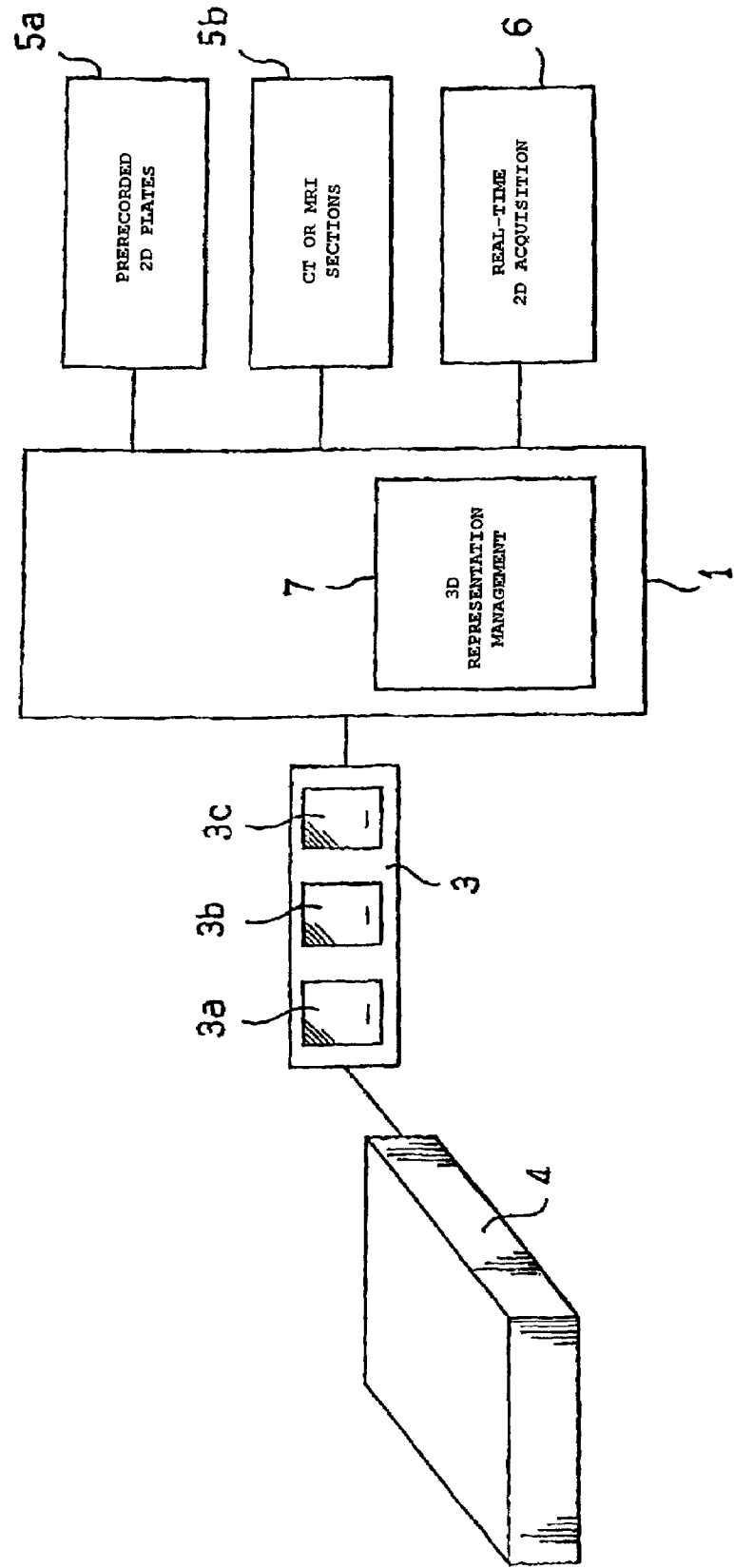

METHOD AND SYSTEM FOR MEDICAL IMAGE DISPLAY OF A THREE-DIMENSIONAL REPRESENTATION

CROSS-REFERENCE TO RELATED APPLICATIONS

This application claims the benefit of a priority under 35 USC 119 to French Patent Application No. 0105611 filed Apr. 26, 2001, the entire contents of which are hereby incorporated by reference.

BACKGROUND OF THE INVENTION

This invention is directed to a method and system for medical image display, and particularly a method and system for use in a surgical procedure theater.

In radiology, a radiologist must be able to understand the exact anatomy of that part of the patient on which surgical procedure is to be performed. Generally, before the procedure, the radiologist acquires a number of two-dimensional images of the region in which the procedure is performed, for example by X-ray imaging, or by tomodensitometry (CT) or magnetic resonance imaging (MRI). In some cases, these images may be used to reconstruct a 3D model of the region. The 3D model enables viewing the region from different angles and to familiarize the radiologist with the anatomy thereof. During the procedure, the radiologist normally uses two-dimensional images obtained in real time by X-ray fluoroscopy. The radiologist may also use previously stored two-dimensional images which will act as reference images. However, these images obtained by fluoroscopy or prerecorded images may lack clarity and therefore may not allow highly accurate viewing of the anatomy on which the procedure is to be carried out.

Reconstructed three-dimensional representations generally show the anatomy much clearer than is possible with images obtained by fluoroscopy. However, at present, three-dimensional models are not used in the operating theater. Three-dimensional models are used independently of the two-dimensional images, generally before the operation, in order for the surgeon to gain a good understanding of the part of the anatomy that must be treated.

BRIEF DESCRIPTION OF THE INVENTION

The invention is directed to a method and a system for medical imaging comprising:
  means for acquiring two-dimensional images;
  means for displaying images;
  means for a managing the display of a three-dimensional representation on the means for display and for automatically orienting the three-dimensional representation according to at least one operating parameter of the means for acquisition so that the three-dimensional representation is viewed on the means for display from a viewpoint corresponding to that from which the means for acquiring images acquire or have acquired a two-dimensional image.

The method and system compares two-dimensional radiological images of an anatomical region with a three-dimensional model of this region without requiring manipulations which could be tedious for the radiologist, even though the radiological images and the three-dimensional representations are images of a very different type, which generally do not lend themselves to comparison.

In an embodiment of the invention, the means for display comprise means for displaying a two-dimensional image acquired in real time at the same time as displaying the three-dimensional representation, the means for management comprising means for automatically orienting the three-dimensional representation according to at least one operating parameter of the means for acquiring images so that the three-dimensional representation is viewed on the means for display from a viewpoint corresponding to that of the image acquired in real time by the means for acquiring images.

According to another embodiment and, as the case may be, an embodiment complementary to the first, the system comprises means for storing images previously acquired, with at least one operating parameter of the means for acquiring images during imaging corresponding to these images, and the means for display comprises means for displaying a two-dimensional image previously acquired at the same time as displaying the three-dimensional representation, the means for management comprising means for automatically orienting the three-dimensional representation according to the operating parameter or parameters stored with an image previously acquired, so that the three-dimensional representation is viewed on the means for display from a viewpoint corresponding to that from which the image was previously acquired.

Also, the means for management comprises means for automatically translating the three-dimensional representation and in centering it in the same way as a two-dimensional image acquired in real time or previously acquired. It may also comprise means for automatically adjusting the scale of the three-dimensional representation with respect to a two-dimensional image acquired in real time or previously acquired.

The system furthermore comprises the following various characteristics taken alone or in combination:
  comprises means for enabling an operator to control the storage of parameters corresponding to one or more preferred orientations for the three-dimensional representations and to display the three-dimensional representations with these orientations;
  comprises means for enabling an operator to control the storage of three-dimensional representations and to control the display of these representations;
  comprises means for reconstructing three-dimensional representations from images acquired by X-ray imaging;
  comprises means for reconstructing three-dimensional representations from images acquired by CT or MRI tomography.

BRIEF DESCRIPTION OF THE DRAWING

Other characteristics and advantages of the invention will also emerge from the following description, which is purely illustrative and nonlimiting and must be read in conjunction with the single FIGURE in the drawing, which is a schematic representation of an imaging system according to one embodiment of the invention.

DETAILED DESCRIPTION OF THE INVENTION

The drawing FIGURE shows schematically an imaging system comprising a means for processing unit 1 and means forming an interface 2 which comprise one or more screens 3 and a control box 4, for example, with buttons and a joystick. The imaging system also comprises means for storage 5a and 5b in which are stored two-dimensional images of the anatomical part to be treated, acquired before the procedure, either by X-ray imaging (5a), or by CT tomography, magnetic resonance, etc. (5b). In addition, the system comprises means 6 for acquiring two-dimensional images of the anatomical part to be operated on, in real time.

For each image or plate, the means for storage 5a and 6 store, in addition to the matrices with pixels, the imaging parameters to which the image corresponds, such as the angular orientation of the imaging direction and possibly other parameters: field of view, distance between the source and the detectors, sensor resolution, position of the table on which the patient lies, rotation of the sensors in their plane, rotation of the image acquired, geometric operations on the image, etc.

The means for acquisition 6 is, for example, an X-ray fluoroscopy imaging means.

The means for processing unit 1 manages the display of the 2D plates acquired before the operation or of the 2D images acquired in real time, depending on the selections controlled by the user from the interface keyboard 4. It also manages, via a subsystem 7, the reconstruction of 3D models and the display of corresponding images.

In the example illustrated in the drawing FIGURE, provision the means for display 3 may comprise three different screens 3a, 3b, and 3c, allowing the simultaneous display of these various image types. Of course, other types of display are possible; in particular, the various image types can be displayed simultaneously on the same screen, subdivided into several display regions.

The three-dimensional models are, in particular, reconstructed by the subsystem 7 from 2D images and particularly from some of the images acquired by X-ray (not fluoroscopy) prior to the operation and stored in the means for storage 5a.

The processing for reconstructing three-dimensional images from two-dimensional images is in itself known from, for example, French Patent Application 2 779 853.

Also, three-dimensional models are also reconstructed where appropriate by the subsystem 7 from CT or MRI tomography sections stored in the means 5b.

Moreover, in order to display 3D images corresponding to the models thus reconstructed, the subsystem 7 comprises means for computing which automatically orient the 3D representation so that it corresponds substantially to the same viewpoint as a 2D image with which it must be displayed on the means 3, and particularly to the same imaging orientation as the latter. To this end, the parameters relating to the imaging orientation of the 2D image are transmitted to the subsystem 7 by the means for storage 5 or by the means for acquisition 6.

The subsystem 7 may also adjust other parameters of the 3D representation, according to the imaging parameters corresponding to the 2D image. For example, the parameter or parameters relating to the position of the table during imaging which corresponds to the 2D image may be used for automatically translating the 3D representation so that it is centered in the same way as the 2D image.

Also, the scale (that is to say the zoom) of the 3D representation may be adjusted in order to correspond substantially with that of the 2D image.

The processing implemented by the means for computing of the subsystem 7 for automatically orienting the 3D representation may be particularly simple and, for example, be based on a simplified geometric description of the parameters involved on image acquisition. In particular, the path of the X-ray tubes and of the detectors around their pivot shaft may be deduced simply from information relating to the angular position of the means for imaging which is part of the acquisition parameters.

Various operating modes may be provided for the imaging system. In particular, when the radiologist wishes to be able to use the 3D model during an operation, a first operating mode is selected. The system then automatically adjusts the 3D representation, and in particular the orientation and possibly the scale and the centering of the latter, via the subsystem 7, so that this representation corresponds substantially to the same viewpoint as the image that it is likely to obtain with the means 6.

When the radiologist acquires images by fluoroscopy, it is then particularly easy to compare the 2D images obtained and the representation which corresponds to this 3D model.

When the radiologist now wishes better understanding of a series of prerecorded 2D images, a second operating mode for the system is selected. In the second mode, the means for storage 5 automatically transmit the parameters relating to the imaging which corresponds to the series of image on which the radiologist wishes to focus, to the subsystem 7 which manages the 3D image. The subsystem 7 then automatically adjusts the 3D representation so that it corresponds to the same viewpoint and possibly to the same scale and to the same centering as the 2D plates which are displayed.

In a third operating mode, the means for management unit is programmed to allow the radiologist to store one or more orientations which correspond to particularly interesting views of the anatomical region that is being studied, when analysis is made of the 3D model. The radiologist may then recall these preselected orientations during the operations.

It will be understood that the invention is in no way limited to X-ray imaging, but may also find an application in 2D and/or 3D images obtained from other medical imaging techniques, namely tomography, magnetic resonance, etc.

Various modifications in structure and/or steps an/or function may be made by one skilled in the art without departing form the scope and extent of the invention as recited in the claims.

What is claimed is:

1. A system for medical imaging comprising:
   means for acquiring two-dimensional images;
   means for displaying images; and
   means for managing the display of a three-dimensional representation of the acquired two-dimensional images on the means for display, and means for automatically orienting the three-dimensional representation according to at least one operating parameter of the means for acquisition so that the three-dimensional representation is viewed on the means for display from a viewpoint corresponding to that from which the means for acquiring images acquire or have acquired a two-dimensional image;
   wherein the means for display comprises means for displaying a two-dimensional image acquired in real time, at the same time as displaying the three-dimensional representation.

2. The system according to claim 1 wherein:
   the means for managing comprises means for automatically orienting the three-dimensional representation according to at least one operating parameter of the acquisition means so that the three-dimensional representation is viewed on the means for display from a viewpoint corresponding to that of the image acquired in real time by means of the means for acquiring images.

3. The system according to claim 1 comprising:
means for storing images previously acquired, with at least one operating parameter of the means for acquiring images during imaging corresponding to these images;
means for display means displaying a two-dimensional image previously acquired at the same time as displaying the three-dimensional representation; and
means for managing automatically orienting the three-dimensional representation according to the operating parameter or parameters stored with an image previously acquired, so that the three-dimensional representation is viewed on the means for display from a viewpoint corresponding to that from which the image was previously acquired.

4. The system according to claim 2 comprising:
means for storing images previously acquired, with at least one operating parameter of the means for acquiring images during imaging corresponding to these images; and
means for display means displaying a two-dimensional image previously acquired at the same time as displaying the three-dimensional representation; and
means for managing automatically orienting the three-dimensional representation according to the operating parameter or parameters stored with an image previously acquired, so that the three-dimensional representation is viewed on the means for display from a viewpoint corresponding to that from which the image was previously acquired.

5. The system according to claim 2 wherein the means for managing automatically translates the three-dimensional representation and centers it in the same way as a two-dimensional image acquired in real time.

6. The system according to claim 3 wherein the means for managing automatically translates the three-dimensional representation and centers it in the same way as a two-dimensional image acquired in real time.

7. The system according to claim 4 wherein the means for managing automatically translates the three-dimensional representation and centers it in the sane way as a two-dimensional image acquired in real time.

8. The system according to claim 1 wherein the means for managing automatically adjusts the scale of the three-dimensional representation with respect to a two-dimensional image acquired in real time.

9. The system according to claim 2 wherein the means for managing automatically adjusts the scale of the three-dimensional representation with respect to a two-dimensional image acquired in real time.

10. The system according to claim 3 wherein the means far managing automatically adjusts the scale of the three-dimensional representation with respect to a two-dimensional image acquired in real time.

11. The system according to claim 4 wherein the means for managing automatically adjusts the scale of the three-dimensional representation with respect to a two-dimensional image acquired in real time.

12. The system according to claim 5 wherein the means for managing automatically adjusts to scale of the three-dimensional representation with respect to a two-dimensional image acquired in real time.

13. The system according to claim 6 wherein the means for managing automatically adjusts the scale of the three-dimensional representation with respect to a two-dimensional image acquired in real time.

14. The system according to claim 7 wherein the means for managing automatically adjusts the scale of the three-dimensional representation with respect to a two-dimensional image acquired in real time.

15. The system according to claim 1 comprising means for enabling an operator to control the storage of parameters corresponding to one or more preferred orientations for the three-dimensional representations and to display the tree-dimensional representations wit these orientations.

16. The system according to claim 1 comprising means for enabling an operator to control the storage of three-dimensional representations and to control the display of these representations.

17. The system according to claim 1 comprising means for reconstructing three-dimensional representations from plates acquired on this same system by X-ray imaging.

18. The system according to claim 1 comprising means for reconstructing three dimensional representations from plates inquired by CT or MRI tomography.

19. A method for medical imaging comprising:
determining geometric parameters relating to acquiring in real-time a two-dimensional image;
acquiring a three-dimensional image representation of the two-dimensional image; and
automatically, adjusting the three-dimensional image representation according to at least one of the geometric parameters so that the representation corresponds to the same viewpoint and is displayed at the same time as the two-dimensional image acquired in real-time.

20. A method for medical imaging comprising:
pre-recording a two-dimensional image of an abject of interest;
transmitting desired parameters relating to the two-dimensional image;
acquiring a three-dimensional image representation of the two-dimensional image;
acquiring in real-time a two-dimensional image of the object of interest; and
automatically adjusting the three-dimensional image representation according to at least one of the desired parameters so that the representation substantially corresponds to the same viewpoint and is displayed at the same time as the two-dimensional image acquired in real-time.

21. The method according to claim 19 wherein the adjustment of the three-dimensional image representation comprises one or more of the following with respect to the view point of the two-dimensional image acquired in real-time: orientation or scaling or centering.

22. The method according to claim 20 wherein the adjustment of the three-dimensional image representation comprises one or more of the following with respect to the view point of the two-dimensional image acquired in real-time: orientation or scaling or centering.

23. The method according to claim 20 wherein the pre-recorded two-dimensional images are of one or more orientations of an anatomical region to be studied.

24. The system according to claim 5 wherein the means for managing automatically translates the three-dimensional representation and centers it in the same way as a two-dimensional image previously acquired.

25. The system according to claim 8 wherein the means for managing automatically adjusts the scale of the three-dimensional representation with respect to a two-dimensional image previously acquired.

26. The method according to claim 19, wherein the automatically adjusting the three-dimensional image representation comprises automatically adjusting the representation in an operating theater where the two-dimensional image is acquired in real-time.

27. The method according to claim 20, wherein the automatically adjusting the three-dimensional image representation comprises automatically adjusting the representation in an operating tester where the two-dimensional image is acquired in real-time.

28. A system for medical imaging comprising:
   means for acquiring two-dimensional images;
   means for displaying images;
   means far managing the display of a three-dimensional representation of the acquired two-dimensional images on the means for display;
   the means for managing comprising means for automatically orienting the three-dimensional representation in response to an image acquisition operational parameter being deduced from information relating to an image acquisition geometric parameter, such that the three-dimensional representation is viewed on the means for display from a viewpoint corresponding to that from which the means for acquiring images acquire or have acquired a two-dimensional image.

29. The system of claim 28, wherein:
   the means for display comprises means for displaying a two-dimensional image acquired in real time, at the same time as displaying the three-dimensional representation.

30. The system of claim 28, wherein the means for automatically orienting further comprises:
   means for automatically orienting the three-dimensional representation in response to the path traversed by the means for imaging being deduced from information relating to the angular position of the means for imaging.

* * * * *

UNITED STATES PATENT AND TRADEMARK OFFICE
CERTIFICATE OF CORRECTION

PATENT NO. : 7,123,255 B2
APPLICATION NO. : 10/125242
DATED : October 17, 2006
INVENTOR(S) : Yves Trousset et al.

It is certified that error appears in the above-identified patent and that said Letters Patent is hereby corrected as shown below:

Title Page,
Item [75], Inventor, after "Yves" delete "Trousett" and insert therefor -- Trousset --.

Column 6,
Line 8, after "the" delete "tree" and insert therefor -- three --.

Signed and Sealed this

Sixth Day of March, 2007

JON W. DUDAS
*Director of the United States Patent and Trademark Office*